Aug. 14, 1962  R. C. RIKE  3,049,100
BRAKE BOOSTER
Filed Nov. 27, 1959

INVENTOR.
Richard C. Rike
BY
His Attorney

United States Patent Office 3,049,100
Patented Aug. 14, 1962

3,049,100
BRAKE BOOSTER
Richard C. Rike, Dayton, Ohio, assignor to General Motors Corporation, Detroit, Mich., a corporation of Delaware
Filed Nov. 27, 1959, Ser. No. 855,691
1 Claim. (Cl. 121—41)

This invention relates to a brake booster and more particularly to a means for supporting a power wall in a brake booster.

Efficient operation of a booster unit requires that a minimum of friction be encountered as the power wall moves forward within the booster unit. One method of achieving this is in providing a diaphragm sealing means in cooperation with the power wall. The diaphragm means being connected to a rigid center portion requires a supporting means to maintain the concentric location of the power wall within the power unit. Accordingly this invention is intended to provided a supporting means where the power wall is centrally supported forward and rearward of the power wall. The supporting means provides a pivoting mount on its rearward end and freedom for slight angular deflection of the power wall by means of a socket support on its forward end.

It is an object of this invention to provide a power wall within the booster unit. The support for the power wall is forward of and rearward of the booster unit per se.

It is a further object of this invention to provide a power wall within a booster unit having a socket support concentrically with the power wall at a point forward of the power wall and a pivoting mount concentrically with the power wall but rearward of the power wall.

It is a further object of this invention to provide a power wall within a brake booster unit having concentric pivoting mounts on the forward and rearward side of said power wall with an adjustment to provide the proper length of the supporting member forward of the power wall.

The objects of this invention are accomplished by providing a master piston for operation within a master cylinder. The master piston has an opening concentrically formed within the master piston extending from the rearward end and having a socket formed in the forward end of this opening. The socket receives a push rod rigidly mounted to the power wall within the booster unit. This forms a ball and socket connection to permit slight angular misalignment of the push rod and the power wall with the axis of the power wall.

The rearward side of the power wall is connected to a support rod pivotally connected to a lever mounted for arcuate movement on a support bracket. This provides a pivoting action on the rearward end of the power wall.

The brake pedal is connected to the pivoting lever through a link which is pivotally connected to both members. As the brake pedal pivots the link moves forwardly pivoting the intermediate lever thereby moving the power wall forward. The support rod connected to the lever moves in a slight arcuate manner carrying the power wall forward as the push rod within the master piston pivots slightly within the socket. In this manner the power wall is floating between the supports on the forward and rearward end and encounters a minimum friction as the power wall moves forward within its housing.

Further objects and advantages of the present invention will be apparent from the following description, reference being had to the accompanying drawings, wherein a pre-embodiment of the present invention is clearly shown.

In the drawings:

FIGURE 1 illustrates a cross section view of the suspension of the power wall.

FIGURE 2 illustrates the brake pedal used as a support for the power wall.

The booster unit is mounted on a support bracket 1. The support bracket 1 is adapted for mounting on the chassis of the vehicle. The forward end of the support bracket 1 is connected to the booster unit 2 by means of a plurality of rivets 3. The booster unit housing comprises two sections, the rearward section 4 and the forward section 5. The two sections 4 and 5 in assembly receive the bead 6 of the diaphragm 7 within the two sections to form a permanent seal.

The forward section 5 of the booster unit 2 is connected to the casting 8 which forms the master cylinder 9 and the reservoir 10. The reservoir 10 encloses the reservoir chamber 11 which is in communication with the central opening 12 of the master cylinder 9 by means of the ports 13 and 14. A seal 15 is mounted on the outer periphery and rearward end of the casting 8 and seals this portion of the casting with the axial extending flange 16 of the forward section 5 of the booster unit 2. The forward end of the master cylinder 9 is provided with a port 17 in communication with a plurality of hydraulic wheel cylinders 18 through conduit 19. A conventional check valve assembly 20 is mounted in the forward end of the master cylinder 9 to maintain a residual pressure within the hydraulic brake fluid actuating system.

The check valve 20 is maintained in its position by the spring 21 which seats on the spring seat 22 abutting the seal 23. The seal 23 is mounted on the forward end of the master piston 24. The master piston 24 is biased to a rearward position to seat on the snap ring 25.

The rearward end of the master piston 24 is provided with an opening extending from the rearward end of the master piston 24. This opening has a slight flare to the rearward end to permit slight angular deflection of a push rod 26 extending into the master piston. The forward end of the push rod 26 has a semi-spherical head 27 for reception in a mating socket 28 in the forward end of the opening of the master piston 24.

The booster unit 2 employs a power wall operating in cooperation with a diaphragm. The central portion of the power wall includes a valve housing 30 mounted against the diaphragm support 31. The valve housing 30 and diaphragm support 31 of the power wall 32 form a seal on an annular bead structure 33 on the inner periphery of the diaphragm 7. An annular bead structure 34 is also provided radially outward from the bead 33 to operate as a buffer as the power wall 32 returns to its retracted position. The annular bead structure 34 seats against the rearward section 4 of the booster unit casing 2. The valve housing is fastened to the diaphragm support 31 by means of a plurality of bolts 35. The power wall 32 is biased to a retracted position by the spring 36 which seats on the rearward side of the forward section 5 of the booster unit casing and the forward side of the diaphragm support 31. The push rod 26 extends rearwardly into the sleeve 37 where it threadedly engages the inner periphery of the sleeve. A lock nut 38 is also provided on the threaded portion of the push rod 26 to lock the sleeve 37 and push rod 36. This provides an adjustment for the length of the push rod extending forwardly from the power wall 32.

The sleeve 37 and the axially extending flange 39 of the diaphragm support 31 are sealed by means of a seal 40. The rearward end of the sleeve 37 seats within a reaction plate 41 which is held in position by a snap ring 42. The spring 36 biases the reaction plate 41 to a contacting position on the rearward side of the diaphragm support 31. The valve housing 30 encloses the vacuum and air valve for operating the booster unit. The air valve member 43 is received within the valve housing 30. The rearward end of the air valve member 43 has a cylindrical portion adapted for operating axially within a mating opening in a rearward end of the valve housing 30. The forward portion of the air valve member 43 is provided with a valve element 44 formed by an annular ridge on the radial wall 45 of the valve member 43. The forward portion of the valve housing 30 receives the reaction disc 46 which is mounted on the forward end of the air valve member 43. The reaction disc 46 is permitted to move axially on the forward end of the air valve member 43. A plurality of reaction fingers 47 are angularly spaced within the air valve housing 30 and pivotally operate against a fulcrum 48 within the valve housing 30. The central portion of the plurality of fingers 47 operate against an annular ridge on the outer portion of the reaction plate 41. Radially inner portion of the reaction fingers 47 operate against the similar ridge on the reaction disc 46. The reaction force transmitted from the master piston 24 is transmitted rearwardly to the push rod 26 to the reaction plate 41. As the force is transmitted to the reaction plate 41, it pivots the plurality of fingers against the reaction disc 46 and the fulcrum 48 of the housing which in turn transmits a force to the air valve member 43. The air valve member 43 is fastened to the support rod 49. The support rod 49 in turn is connected to the manual operating means for the booster unit.

The vacuum valve element 50 is formed by an annular ridge within the inner periphery on the valve housing 30. The vacuum valve seat 51 and the air valve seat 52 are formed on separate portions of a rubber annulus 53. The rubber annulus 53 is bonded to the seat support 54. The seat support 54 is constructed of a metal sleeve having a radial flange to provide a bonding surface for the rubber annulus 53. The seat support 54 is mounted on the radially inner portion of the seat diaphragm 55. The seat diaphragm 55 is provided with bumpers 56 on the axially forward portion and receives the seat support 54. The seat diaphragm 55 extends radially outward to fit the inner periphery of the valve housing 30. The outer periphery of the seat diaphragm 55 is retained in its position by a snap ring 57. In this manner the seat diaphragm 55 provides a means for flexing of the diaphragm to permit axial movement of the vacuum valve and air valve seats.

The radially inner portion of the seat diaphragm 55 carrying the seat support 54 is biased to a rearward position by the spring 58. The spring 58 is seated within an annular recess on the reaction disc 46. The opposite end of the spring 58 is seated on a radial wall of the seat diaphragm 55. In this manner the vacuum valve seat 51 is biased to a closed position or contacting position with the vacuum valve element 50. This is the normal position for the vacuum valve in the nonoperating position of the booster unit.

The air valve member 43 has a radial wall 45 on its forward side for seating a spring 60. The spring 60 is seated between the radial wall on the forward side of the air valve member 43 and the rearward side of the reaction plate 46. In this manner the air valve member 43 is biased to the normally retracted position so that the air valve element 44 is in spaced relation to the air valve seat 52.

The power wall 32 is supported on its rearward end by means of a sliding air valve 43. The sliding air valve 43 fits the mating portion of the rearward end of a valve housing 30 and is fastened to the support rod 49. The push rod 49 in turn is pivotally mounted on the lever 65. The lever 65 is pivotally mounted on its lower end on bracket 1 by means of a pin 66 and bushing 67. In this manner the rearward end of the power wall moves forwardly with the pin 68 supporting the support rod 49 moving through a slight arc about the pivoting point of the pin 68. This creates a slight axial misalignment of the power wall within the casing 2. The misalignment however is slight and adequate clearance is provided between the diaphragm support 31 to permit operation of the power wall within the casing 2. The forward end of the push rod 26 supporting the power wall 32 is fitted within a socket to permit slight misalignment and yet maintain the power wall in suspended position.

The return spring 12 in the master cylinder maintains a contact between the semispherical head 27 of the push rod 26 and the socket 28 in the master piston 24. The return spring 36 also biases the power wall to a rearward position. The brake pedal 75 is biased to a rearward position contacting the bumper 76 supported on the fire wall 77.

The power wall is supported within the casing 2 and is freely suspended to prevent operation with a minimum friction. The lever 65 is pivotally mounted on the support bracket 1 which is fastened to the casing 2. An additional link 79 is pivotally connected to the intermediate portion of the lever 65 and the brake pedal 75. This provides the actuating means between the brake pedal 75 and the lever 65.

A source of vacuum 100 is provided through means of a manifold on a vehicle engine. The manifold 100 is connected to a conduit means 101 which is in communication with the vacuum chamber 80. The vacuum chamber 80 is an annular chamber formed by the valve seat diaphragm 56, the valve housing 30 and the vacuum valve. The vacuum valve element 50 in cooperation with the vacuum valve seat 51 controls the vacuum to the booster unit.

The air chamber 83 is in communication with the atmosphere through the opening 102 on the rear end of the casing 4. An opening 103 is also provided within the valve housing 30 to place the air chamber 95 in communication with chamber 83. When the air valve element 44 is in spaced relation to the air valve seat 52, the air chamber 95 is in communication with the passage 81 and the chamber 82. The chamber 82 on the forward side of the power wall 32 is controlled through the air valve and vacuum valve.

FIGURE 1 illustrates a means for supporting the power wall on the forward and rearward side. The rearward side is supported by the link 65 which is pivotally supported on the pin 66. It is not necessary that the power wall be supported on a separate link 65. FIGURE 2 illustrates a modification wherein a pedal 110 is pivotally supported on a pin 111 which in turn is mounted on a bracket 112. This provides a supporting means for a pendant type lever 110. The pendant type lever 110 is pivotally connected to the push rod 113 by means of a pin 114. In this manner, the pedal 110 supports the rearward end of the power wall through the push rod 113.

The bracket 112 is supported on the power wall 115 which also supports the booster unit 116. The forward side of the booster unit is also connected to the master cylinder 117. The supporting of the power wall on the forward end is in the same manner as illustrated in FIGURE 1. The operation of the booster unit is in the same manner as the booster unit shown on FIGURE 1. The only exception being that the device illustrated in FIGURE 1 operates the lever 65 through the push rod 79 which is pivotally connected to the pedal 75. The supporting of the power wall on a pivoting member and also its connection within the master piston is the same generally in each version.

The booster unit operates in the following described manner. The spring 36 biases the power wall 32 to a normally retracted position where the annular bead section 34 is contacting the wall of the rear section 4 on the housing 2. The return spring 21 within the master cylinder 9 biases the master piston to its rearward position seating on the snap ring 25. The nut 38 is adjusted so that in this position the semi-spherical head 27 of the push rod 26 is also firmly seated within the socket 28. The support rod 49 is pivotally connected to the lever 65. The brake lever 75 is connected through line 79 to lever 65 and seats on the bumper 76 in the retracted position.

As the brake pedal 75 is depressed, the link 79 pivots the lever 65 forwardly. The forward pivoting action of the lever 65 moves the support rod 49 forward carrying the air valve member 43. Continuous forward movement of the air valve member 43 seats the air valve element 44 on the annular air valve seat 52. In this position the air valve is closed and the vacuum valve is also closed.

Further forward movement of the air valve member 43 firmly seats the air valve element 44 on the air valve seat 52. The vacuum valve element 50 mounted on the valve housing 30 contacts the vacuum valve seat 51. As the air valve member 43 moves forward the vacuum valve seat 51 moves away from the vacuum valve element 50. This places the vacuum chamber 80 in communication with the passage 81. The passage 81 is in direct communication with forward chamber 82 within the power unit. With the vacuum in the chamber 82 the power wall moves forward as air is in the chamber 83 behind the power wall. As the power wall 32 moves forward the rearward end of the support rod 49 pivots in an arcuate manner and a forward end of the push rod 26 pivots slightly within the socket 28. The power wall 32, however, is suspended between the socket 28 and the pivot point of the pin 68 on lever 65 and is freely suspended to permit freedom of movement forwardly within the power unit casing 2. The supporting of the power wall 32 on its forward end in the socket as illustrated eliminates any cantilever effect on the master piston 24. The weight is supported by the forward and rearward end of the master piston and distributed to prevent a cocking action of the piston 24. The rearward end of the power wall is pivotally supported by the pin 68 in the lever 65. This is a pivoting support for the power wall which permits forward movement of the power wall with a minimum amount of friction. The return springs bias all connections to a contacting position to eliminate any play in the mechanism.

The power wall moves forwardly to its full forward position as the lever 65 moves through a segment of an arc of a circle about the pin 66. As the lever pivots in an arc, the power wall becomes slightly misaligned with the axial center of the booster unit. This however is not sufficiently great to create any problem in the operation of the booster unit. The opening in the rearward end of the master piston 24 is flared at its rearward end to permit slight misalignment of the push rod 26. The boot 90 is also flexible and the opening in the rearward end of the rear section 4 of the housing 2 of the booster unit is large enough to permit this slight axial misalignment of the power wall 32 within the booster unit housing 2.

As the brake pedal 75 is released the springs 12 and 36 move the master piston and the power wall rearwardly. The rearward movement of the power wall carries the air valve member 43 rearwardly within the valve housing 30.

The sliding air valve member 43 is biased to a rearward position by the spring 60. As the sliding air valve member 43 moves rearwardly the vacuum valve seat 51 biased by the spring 53 contacts the vacuum element 54 thereby closing the vacuum valve and cutting off the vacuum chamber 80 from the passage 81. In this position where the vacuum valve and the exhaust valve are both in the closed position the booster unit is in the hold position.

Further rearward movement of the air valve member 43 opens the air valve element 44 from the air valve seat 52; this places the air chamber 95 in communication with the passage 81 and places air pressure in front of the power wall 32 in chamber 82. The power wall 32 pivots slightly relative to the axis of the booster unit housing 2. As previously mentioned this slight misalignment has no effect on the operation of the booster unit. It merely provides a supporting means for freely suspending the power wall within the booster unit to permit maximum efficiency in operation of the booster unit.

While the embodiment of the invention as herein disclosed constitutes a preferred form, it is to be understood that other forms might be adopted.

What is claimed is as follows:

In a device of the character described comprising in combination, a brake booster unit including, a housing means, a power wall comprising a rigid portion of substantially smaller diameter than the inner periphery of the housing means, a diaphragm sealed on its inner periphery by said rigid portion of said power wall, an outer periphery of said diaphragm sealed by said housing means, a cylindrical member mounted concentrically on the forward end of said housing means, a mating annular member received within said cylindrical member maintaining axial alignment with said cylindrical member, a central support portion extending forwardly from said power wall, a hemispherical head on the forward said end of said forward extending portion of said power wall, a central opening extending forwardly from the rearward end of said mating annular member, a hemispherical socket in said opening receiving said head of said forwardly extending portion of said power wall, a central rearwardly extending means from said power wall, said central rearwardly extending means pivotally connected to a lever, a support means supporting said housing means, said lever pivotally supported on said support means, means for pivoting said lever on said support means thereby moving the rearward end of said power wall in an arcuate manner and pivoting of the forward end of said power wall when said booster unit is operated.

References Cited in the file of this patent
UNITED STATES PATENTS

| | | |
|---|---|---|
| 1,846,089 | Davis | Feb. 23, 1932 |
| 2,752,892 | Banker | July 3, 1956 |
| 2,910,048 | Ingres | Oct. 27, 1959 |
| 2,916,882 | Spalding et al. | Dec. 15, 1959 |
| 2,918,041 | Stelzer et al. | Dec. 22, 1959 |
| 2,925,805 | Schultz | Feb. 23, 1960 |
| 2,934,042 | Stelzer | Apr. 26, 1960 |